United States Patent

Riggins

[15] 3,696,315

[45] Oct. 3, 1972

[54] LINE TRAPS FOR POWER LINE CARRIER CURRENT SYSTEMS

[72] Inventor: Oral L. Riggins, Odon, Ind.

[73] Assignee: Westinghouse Electric Corporation, Pittsburgh, Pa.

[22] Filed: Sept. 24, 1970

[21] Appl. No.: 74,993

[52] U.S. Cl. .................. 336/192, 336/84, 336/197, 336/207
[51] Int. Cl. ..................... H01f 27/08, H01f 15/10
[58] Field of Search......... 336/197, 84, 207, 192, 199

[56] References Cited

UNITED STATES PATENTS

| 1,747,507 | 2/1930 | George | 336/207 X |
| 1,813,994 | 7/1931 | George | 336/207 X |

FOREIGN PATENTS OR APPLICATIONS

| 756,250 | 4/1967 | Canada | 336/207 |

Primary Examiner—Thomas J. Kozma
Attorney—A. T. Stratton, F. P. Lyle and Gordon H. Telfer

[57] ABSTRACT

A line trap is provided in an arrangement facilitating current balance between a plurality of layers as well as providing mechanical stability. The line trap includes a coil of an electrical conductor with an end frame at each end that comprises a plurality of bars extending radially outward from a central hub. The radial bars are mechanically attached to the coil structure and also provide a path for electrical conduction from the layers of the coil to centrally located connector taps. The radial bars also permit terminating coil layers at desired fractions of a turn to achieve current balance. Preferably the layers of the coil have turns uniformly spaced from the axis with uniform spacing between adjacent turns of all the layers.

5 Claims, 5 Drawing Figures

PATENTED OCT 3 1972

WITNESSES
Theodore F. Wrobel
James T. Young

INVENTOR
Oral L. Riggins
BY Gordon H. Telfer
ATTORNEY

3,696,315

LINE TRAPS FOR POWER LINE CARRIER CURRENT SYSTEMS

BACKGROUND OF THE INVENTION

1. Field of the Invention

The invention is directed to line traps for providing inductance in power line carrier current systems.

Description of the Prior Art

Line traps are inductive impedance elements used in carrier current systems for transmitting information on power transmission lines. Recent emphasis in the transmission line filed has been on extra high voltage (EHV) transmission lines. Such systems normally involve longer transmission lines than formerly and result in higher resistive impedance necessitating new values of inductive impedance in the carrier current system. The line traps are connected directly to the transmission line and have to be able to carry currents ranging from hundreds of amperes up to at least a few thousand amperes. In designing and manufacturing a line trap, it is important to consider size and weight factors for minimum cost as well as to provide an apparatus for the desired electrical function without incurring problems because of the large mechanical stresses that can be produced by such large currents.

To keep line trap structures in moderate size, it has been known that it is helpful to use a plurality of coil layers connected in parallel. Ordinarily, the prior art has been limited to coils of only two layers because of difficult problems in achieving current balance between layers of a coil having more than two layers. Current balance is important because it provides the lowest power loss and lowest mechanical stresses. Severe stresses can result from current imbalance that produces a temperature imbalance in the coil. The current magnitude in each layer depends on its impedance as well as the effect of the adjacent layers' magnetic flux. Thus there has not been apparent a straightforward manner to achieve new inductance values while readily maintaining current balance.

There has been a known design technique for line traps having coils of three layers in which the turns in successive layers are spread over the same axial length, with fewer turns in the successively outward layers. This results in unequal spacing between turns in the various layers producing difficult manufacturing problems to achieve current balance.

The prior art has also employed arrangements of two layers in the coils in which the turns in both layers have the same uniform spacing. Such an arrangement has been satisfactory but has been limited to application in only two layers because of difficulty in achieving current balance in successive layers. That is, it has not been considered a straightforward procedure to extend the arrangement conventionally used for two layers to coils with a larger number of layers.

SUMMARY OF THE INVENTION

In accordance with this invention line traps are provided with coils in a plurality of layers of turns in a manner that permits ease of assembly as well as current balance between layers. The inventive line traps also include other design features for minimizing mechanical stresses.

Each end of the coil is secured to an end frame that comprises a plurality of bars extending radially outward from a central hub. The bars are of conductive material and provide, in addition to mechanical support, an electrical path from the various coil layers to connector taps located proximate the center of the end frame. The plurality of conductive bars, for example eight, permits connection to a particular layer of turns at increments of a coil, such as one eighth of a turn, as may be found necessary to achieve proper current balance.

The turns in each of the coil layers are uniformly spaced from the central axis with uniform spacing between adjacent turns. The turns in the outer layers are directly radially spaced from adjacent turns of the next inner layer. The outer turns are generally (but not necessarily) of fewer turns than the inner layers and are symmetrically arranged with respect to the center of the innermost layer. The number of coil layers used may be up to six or more with adequate current balance.

DESCRIPTION OF THE PREFERRED EMBODIMENTS

Figure 1:
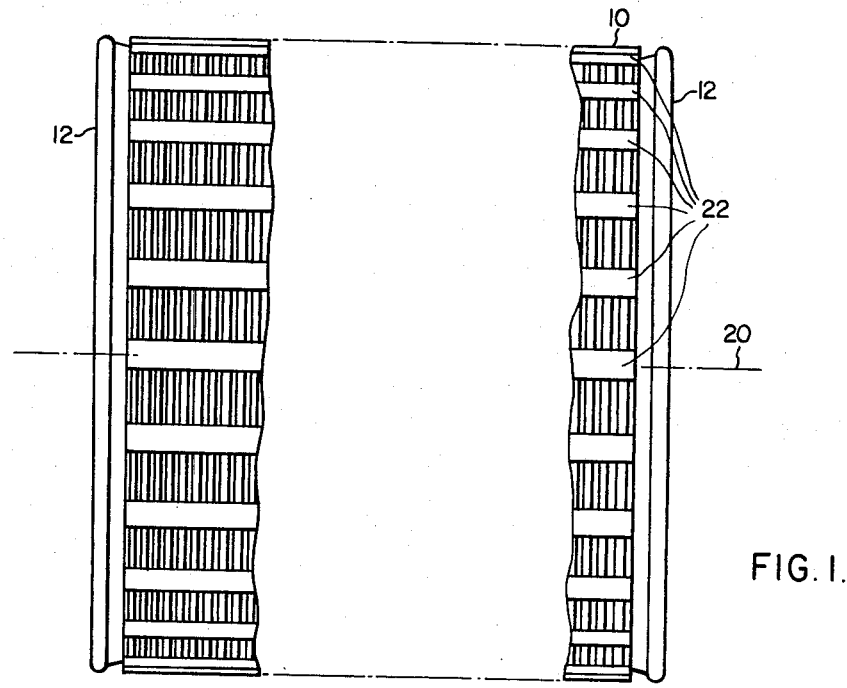
FIG. 1 is a side elevational view of apparatus in accordance with one embodiment of the present invention.
Figure 3:
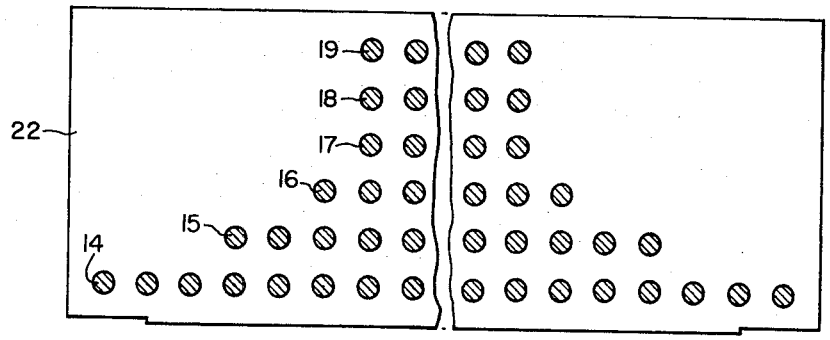
FIG. 3 is a partial sectional view of a coil that may be used in the apparatus of FIGS. 1 and 2.
Figure 2:
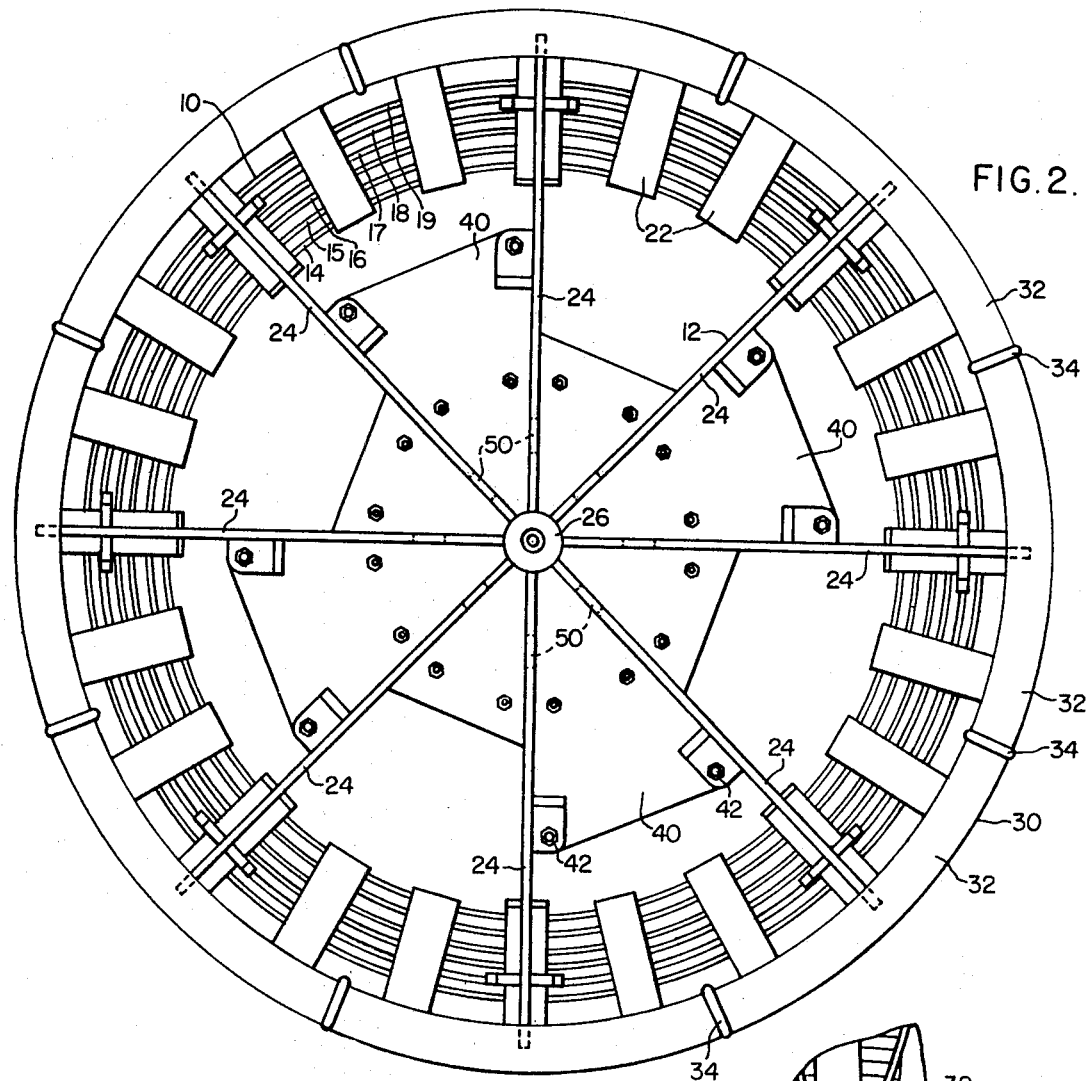
FIG. 2 is an end elevation view of the apparatus of FIG. 1.

In the drawing, particularly FIGS. 1, 2 and 3, the line trap comprises a cylindrical coil section 10 with an end frame 12 at each end thereof. The coil section 10 comprises a plurality of layers of turns 14 through 19 concentrically arranged about a center axis 20. In the example illustrated, six such layers are shown although the invention is not so limited. The layers 14 and 19 are electrically in parallel. The coil conductor is a cable of sufficient size to enable carrying the currents encountered in applications for line traps. It has in the past been necessary to use large cables for another reason, that is to help minimize current unbalance between the various layers. In accordance with this invention, it is made practical to use several smaller cables which permit the construction of the line trap of smaller overall dimensions with less material therein. Commercial apparatus in accordance with the present invention has been constructed with cables having a diameter of 0.891 inch whereas prior line traps conventionally had cables of substantially larger size.

The coil layers 14 through 19 are supported in fixed position with uniform spacing between adjacent turns of a layer and between the various layers by axially extending bars 22 which may be of a cast or premolded plastic material.

Figure 4:
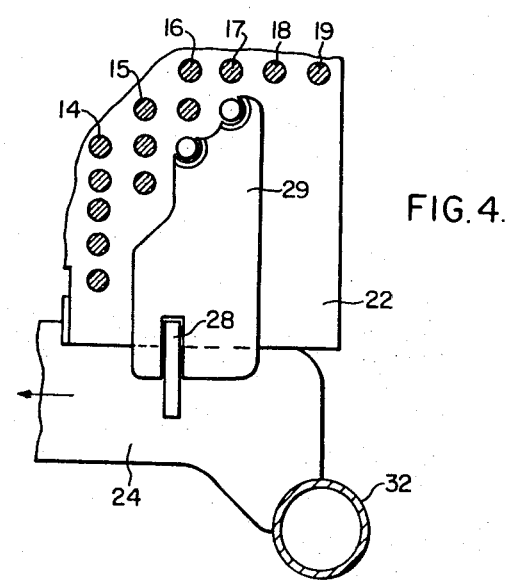
FIG. 4 is a partial elevational view of a portion of the apparatus of FIGS. 1 and 2.

Each end frame 12 of the line trap (see FIG. 2) comprises a plurality of conductive bars 24 extending radially outward from a hub 26 at the axial center of the frame. The radial bars 24 may be of cast or sheet aluminum and provide structural support as well as electrical continuity from the various coil layers 14–19 to terminals proximate to the hub 26. In this embodiment there are eight radial bars 24 in each end frame 12 although the number may obviously be varied. As shown in FIG. 4 as an example, a support bracket 28 extends from a radial bar 24 around the end of one of the axially extending coil support bars 22 to unite the end frame 12 and the coil structure 10. Also conductive connection is made from each of the several layers to one of the radial bars 24 at each end by a plate-like cable adapter member 29. The bracket 28 is a U-shaped member rigidly joined to bar 24 and member 29. FIG. 4 also shows the end of axial bar 22 resting in a notch in bar 24 (the arrow shows the direction to the hub 26). In the example of FIG. 4 the bracket 28 joins the third and fourth coil layers 16 and 17 to the particular bar 24 shown. Other ones of the bars 24 will connect with coil layers 14, 15, 18 and 19 either singly or in multiples. Some of the individual bars 24 will have no electrical function and will merely support an end of a bar 22.

Around the periphery of the radial bars 24 extends a circular corona ring 30 which comprises arcuate sections 32 of conductive pipe, such as of aluminum, that are insulated from each other by insulative inserts 34 such as of fiberglass to prevent circulating currents.

Terminal points 50 for external connection of the line trap are provided on the radial bars 24 towards the hub 26 with various radial positions to permit ease in making the necessary connections. The terminal points 50 are each a pattern of holes in the bars 24 for receiving a standard connector of an external conductor.

A principal advantage of the present invention is the degree of flexibility permitted in the choice of the exact length of each coil layer so as to achieve close current balance. It is here possible to connect to the various coil layers at certain fractions of a turn which can have a pronounced effect and greatly facilitate achieving current balance. In the embodiment illustrated, eight positions are available for connection to the six coil layers. In other forms, greater numbers of bars 24 would permit even greater flexibility in this regard.

Another advantage of this invention principally result from a manner of winding the various coil layers so that they are readily assembled. FIG. 3 illustrates the coil arrangement wherein the various coil layers 14–19 each have uniform spacing between turns. For the example previously referred to of 600 MCM cable a spacing between layers of approximately 1.41 inches center to center has been used. The basic arrangement of turns is simply that the first inner layer 14 having the greatest number of turns (because of the smallest diameter of the turns) has disposed around it the successive layers 15–19 of (usually) lesser turns which are symmetrically disposed about the axial center of the first layer. The change in axial length of the coil layers while retaining uniform spacing between turns of the layer permits ease of assembly and permits a consistent coil fabrication technique to be applied essentially regardless of the size of the line trap.

The exact number of turns in each layer is necessarily determined at least in part empirically. It has been found in the practice of this invention that it is not always desirable that outer layers have fewer turns. In an example of coils of six layers that have been made of 0.891 inch diameter cable on 1.41 in. centers, outside overall coil diameter about 6 feet, the numbers of turns in each layer were:

| 1st layer | (14) | 40 | turns |
| 2nd layer | (15) | 34⅛ | turns |
| 3rd layer | (16) | 30⅞ | turns |
| 4th layer | (17) | 29¼ | turns |
| 5th layer | (18) | 28⅝ | turns |
| 6th layer | (19) | 28⅝ | turns |

The increase in the sixth layer over the fifth is a result of flux intensity in the combination. This line trap was rated at 3,000 amperes and 1.00 milli-henries and has a current that is balanced within ± 1 percent. For different current ratings, the number of coil layers need merely be changed (500 amperes per layer using the cable referred to). For different inductance ratings merely the length (number of turns in the various layers) need be changed. Thus a consistent assembly procedure is provided.

Figure 5:
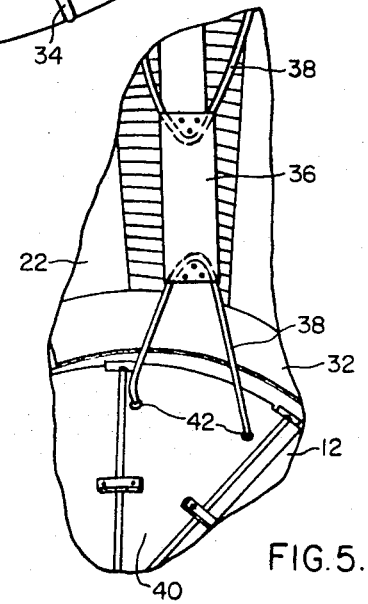
FIG. 5 is a partial perspective view of an interior portion of the apparatus of FIGS. 1 and 2.

Referring to FIG. 5, the two end frames 12 are held to each other with internal support members 36 on rigid V-shaped brackets 38. Element 36 is a sandwich of three fiberglass sheets, the internal one of which has V notches to receive the brackets 38 and the outer ones overlap the ends of the brackets and are securely joined. Torsional forces that are induced at each end of the line trap by the current passing through the coil are transferred to the other end and are thereby cancelled. Plates 40 that are joined to the radial bars 24 provide anchor points 42 for the strain members 36.

I claim:

1. A line trap to provide inductance for a power line carrier current system comprising: a coil of an electrical conductor, said coil having at least first and second concentric, electrically parallel, layers of turns about a central axis, said turns in each of said layers being uniformly spaced from said axis with uniform spacing between adjacent turns, said second layer being spaced outside said first layer and comprising a number of turns directly radially spaced from turns of said first layer, and end frame at each end of said coil supporting said coil and including means to terminate said layers at fractions of a full turn to achieve current balance between said layers, and a plurality of axially extending bars joined at their ends to said end frames and arranged in a generally cylindrical configuration, said axial bars having said turns of said layers extending therethrough to secure the uniform positioning of said turns.

2. The subject matter of claim 1 further comprising: said at least first and second layers of turns including a third layer of turns directly radially spaced from turns of said first and second layers, said second and third layers being each disposed symmetrically about the axial center of said first layer.

3. A line trap to provide inductance for a power line carrier current system comprising: a coil of an electrical conductor in a plurality of turns about a central axis; and end frame at each end of said coil comprising a plurality of bars extending radially outward from a central hub, said bars supporting said coil and also electrically connecting to said coil; said coil having at least first and second concentric layers of turns about a central axis, said turns in each of said layers being uniformly spaced from said axis with uniform spacing between adjacent turns, said second layer being outside said first layer of turns and comprising a number of turns directly radially spaced from turns of said first layer; and a plurality of axially extending bars joined at their ends to said end frames and arranged in a generally cylindrical configuration; said axial bars having said turns of said layers extending therethrough to secure the uniform positioning of said turns.

4. The subject matter of claim 3 wherein: each of said end frames comprises a plurality of plate members, each said plate member joined to an adjacent pair of said bars; and a means for transmitting torsional forces between said end frames extends between plate members of said two end frames.

5. The subject matter of claim 3 wherein: said radially extending bars support terminals for external electrical connection of said line trap; said coil layers each being terminated at a selected one of said radially extending bars to provide coil layer lengths of integral turns and fractions of a turn that result in current balance between said layers.

* * * * *